(12) United States Patent
Maddi et al.

(10) Patent No.: US 8,927,240 B1
(45) Date of Patent: Jan. 6, 2015

(54) THERMAL FRACTIONATION OF BIOMASS OF NON-LIGNOCELLULOSIC ORIGIN FOR MULTIPLE HIGH-QUALITY BIOFUELS

(75) Inventors: Balakrishna Maddi, Toledo, OH (US); Sridhar Viamajala, Toledo, OH (US); Sasidhar Varanasi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 104 days.

(21) Appl. No.: 13/294,510

(22) Filed: Nov. 11, 2011

Related U.S. Application Data

(60) Provisional application No. 61/413,177, filed on Nov. 12, 2010.

(51) Int. Cl.
*C12P 7/06* (2006.01)
*C12P 7/08* (2006.01)
*A61K 36/00* (2006.01)

(52) U.S. Cl.
USPC ............................. 435/161; 435/163; 530/370

(58) Field of Classification Search
None
See application file for complete search history.

(56) References Cited

U.S. PATENT DOCUMENTS

| | | | |
|---|---|---|---|
| 3,793,189 A * | 2/1974 | Corbett | 208/23 |
| 2009/0082604 A1 * | 3/2009 | Agrawal et al. | 585/242 |
| 2009/0139137 A1 * | 6/2009 | Ikura et al. | 44/308 |

OTHER PUBLICATIONS

Demirbas MF. Birefineries for biofuel upgrading: A critical review. 2009. Applied Energy. 86:S151-S161.*
Dote Y et al. Recovery of liquid fueld from hydrocarbon-rich microalgae by thermochemical liquefaction. 1994. Fuel. 73:1855-1857.*
Grierson S et al. Thermal characterisation of microalgae under slow pyrolysis conditions. 2009. Journal of Analytical and Applied Pyrolysis. 85:118-123.*
Mata TM et al. Microalgae for biodiesel production and other applications: A review. 2009. Renewable and Sustainable Energy Reviews. p. 1-16.*
Miao X et al. Fast pyrolysis of microalgae to produce renewable fuels. 2004. Journal of Analytical and Applied Pyrolysis. 71:855-863.*
Ross AB et al. Classification of macroalgae as fuel and its thermochemical behavior. 2008. Bioresource Technology. 99:6494-6504.*
Ross AB et al. Investigation of the pyrolysis behaviour of brown algae before and after pretreatment using PY-GC/MS and TGA. 2009. Journal of Analytical and Applied Pyrolysis. 85:3-10.*
Bridgwater AV. Renewable fuels and chemicals by thermal processing of biomass. 2003. Chemical Engineering Journal. 91:87-102.*
Peng W et al. Effects of temperature and holding time on production of renewable fuels from pyrolysis of Chlorell protothecoides. 2000. Journal of Applied Phycology. 12:147-152.*

* cited by examiner

*Primary Examiner* — Manjunath Rao
*Assistant Examiner* — Paul Holland
(74) *Attorney, Agent, or Firm* — MacMillan, Sobanski & Todd, LLC

(57) ABSTRACT

Methods for production of multiple biofuels through thermal fractionation of biomass feedstocks are described.

22 Claims, 12 Drawing Sheets
(11 of 12 Drawing Sheet(s) Filed in Color)

THERMAL FRACTIONATION OF BIOMASS OF NON-LIGNOCELLULOSIC ORIGIN FOR MULTIPLE HIGH-QUALITY BIOFUELS

CROSS-REFERENCE TO RELATED APPLICATIONS

This application claims the benefit of U.S. Provisional Application Ser. No. 61/413,177 filed Nov. 12, 2010, the entire disclosure of which is expressly incorporated herein by reference.

STATEMENT REGARDING FEDERALLY SPONSORED RESEARCH

This invention was made with government support under Contract Number 203350, awarded by US Air Force Research Office subcontracted through the Center for Innovative Food Technologies (Toledo, Ohio). The government has certain rights in the invention.

TECHNICAL FIELD AND INDUSTRIAL APPLICABILITY OF THE INVENTION

The present invention relates to a method for production of multiple biofuels through thermal fractionation of non-lignocellulosic biomass feedstocks.

BACKGROUND

Most thermochemical treatment techniques for fuel production entail pyrolysis and/or gasification. These processes are traditionally practiced with lignocellulosic biomass and coal. Pyrolysis involves heating the feedstock in the absence of oxygen and leads to cleavage of chemical bonds to yield smaller molecules alkanes, alkenes, alkadienes, carboxylic acids, aromatics, and small amounts of gaseous products. Collectively, the condensable, non-gaseous components are called bio-oil. The pyrolyzed material or original feedstock can also be gasified by heating in the presence of a limited amount of air/steam. Gasification produces syngas typically containing a mixture of CO, $H_2$, $CO_2$ and $H_2O$ and $CH_4$. The goal of traditional pyrolysis/gasification methods is to produce bio-oil or syngas and these processes are carried out at elevated temperatures (typically 800 to 950° C.).

A thermochemical pretreatment technology, "torrefaction" has been suggested for lignocellulosic biomass. In torrefaction, the biomass is heated in the absence of oxygen, at 200°-300° C. and near atmospheric pressure. At these relatively low temperatures, thermally labile components of lignocellulosic biomass, such as hemicellulose, are volatilized leaving behind a stable, hydrophobic residue, with higher energy density than the original feedstock. After the torrefaction, the product (solid residue) can be compacted to produce energy-dense pellets. Thus, the primary goal of torrefaction of lignocellulose is to improve feedstock storage and transport. In addition, the torrified residue is directly compatible with traditional pyrolysis and gasification methods and suitable for co-firing with coal.

For lignocellulosic material, hemicelluloses and cellulose display narrow volatilization temperature regions (220-300 and 315-400° C., respectively). However, lignin volatizes over a broad temperature range of 200-900° C. This overlap of volatilization/degradation temperatures between the different lignocellulose polymers prevents separation of distinct biopolymer-specific volatile fractions. Therefore, for lignocellulosic materials, torrefaction is merely a feedstock pretreatment technique to facilitate better storage and transport.

Traditionally bio-oils are upgraded through hydrogenation and deoxygenation to infrastructure-compatible high energy density fuels such as green gasoline or diesel. Generally, bio-oils produced after pyrolysis are separately subjected to these upgradation methods. However, this approach leads to loss of volatiles as well as to polymerization and gumming reactions during storage or transport. Traditionally fuels from algae and other oleaginous materials involve extraction of the triglycerides followed by transesterification with methanol or ethanol.

SUMMARY

Overall, a method for production of multiple biofuels through thermal fractionation of non-lignocellulosic biomass is described.

Integration of hydrotreatment processes with pyrolysis can make the entire process more energy efficient through heat integration (condensation and re-vaporization of bio-oils is avoided) and reduce storage/handling/transport costs as well as associated loss of bio-oil quality.

The method involves heating the biomass feedstock in an inert and oxygen-free environment and is performed at lower temperatures than conventional pyrolysis. The method results in the production of bio-oils, gases and char.

In a first broad aspect, there is provided herein a method comprising for thermally fractionating a non-ligninaceous biomass feedstock using distinct, non-overlapping degradation temperature windows of component biopolymers found in the biomass.

In another broad aspect, there is provided herein a method of thermal fractionation of a biomass having multiple biopolymer components, where the method includes:

a) rapidly heating the a biomass comprised of multiple biopolymer components, the biomass being heated to a volatilization temperature of a lowest-boiling biopolymer, or first, component, thereby producing at least one volatilized compound;

b) holding the temperature of the heated biomass of step (a) substantially constant for a period of time sufficient until substantially no further mass loss of the first component occurs;

c) rapidly heating the biomass remaining from step (b) to a volatilization temperature of a next higher-boiling biopolymer, or second, component, thereby producing at least one volatilized compound;

d) holding the temperature of the heated biomass of step (c) substantially constant for a period of time until substantially no further mass loss of the second component occurs;

e) rapidly heating the biomass remaining from step (d) to a volatilization temperature of a highest boiling component, or third, component, thereby producing at least one volatilized compound; and f) holding the temperature of the heated biomass of step (e) substantially constant for a period of time until substantially no further mass loss of the third component occurs.

In certain embodiments, the lowest-boiling biopolymer, or first, component substantially comprises protein or protein-derived materials.

In certain embodiments, the next higher-boiling biopolymer, or second, component substantially comprises one or more of: starch-like polymer, carbohydrates, cellulosic polymers and hemicellulosic polymers.

In certain embodiments, the highest boiling biopolymer, or third, component substantially comprises one or more of: lipids and triacylglycerides.

In certain embodiments, the method further includes: allowing the method to occur in anoxic conditions maintained by purging one or more steps with at least one inert purge gas.

In certain embodiments, the method further includes: allowing the at least one inert gas to substantially continuously remove one or more volatilized compounds being generated.

In certain embodiments, $H_2$ is used as a purge gas to achieve simultaneous, and at least partial, hydrogenation of the volatilized compounds.

In certain embodiments, the method further includes: substantially maintaining a flow rate of the purge gas such that residence times of the volatilized compounds resulting from the biomass feedstock is about 2 seconds or less.

In certain embodiments, the method further includes: substantially maintaining a flow rate of the purge gas for a time sufficient to minimize degradation of volatilized compounds into non-condensable gases, such as CO, $CO_2$, $CH_4$ or $H_2$.

In certain embodiments, the method further includes: lengthening one or more of the holding steps for a time sufficient to increase production of the volatized compounds.

In certain embodiments, the method further includes: condensing at least one of the volatilized compounds to produce one or more bio-oils.

In certain embodiments, the first component comprises protein materials, and the method further includes: passing a mixture of volatilized compounds resulting from the protein materials through a hydro-denitrification process to remove N-compounds.

In certain embodiments, the first component comprises protein materials, and the method further includes: subjecting a mixture of volatilized compounds resulting from the from the protein materials to downstream purification to recover high value N-compounds.

In certain embodiments, the first component comprises protein materials, and the method further includes: substantially combusting the volatilized compounds resulting from the protein materials for recovery of process heat.

In certain embodiments, the first component comprises protein materials, and the second component comprises carbohydrate materials, and the method further includes:

i) mixing volatilized compounds from the carbohydrate materials and/or from the protein materials with $H_2$, and ii) passing the $H_2$ mixture of step i) through a catalytic reactor to cause one or more of hydrogenation and deoxygenation of the volatilized compounds to occur.

In certain embodiments, the method further includes the step of:

iii) condensing the hydrogenated and/or deoxygenated volatilized compounds of step ii) to form substantially vehicle-ready fuel.

In certain embodiments, the bio-oil production and upgradation occur in a single integrated system.

In certain embodiments, the third component comprises lipid materials, and the method further includes: esterifying the volatilized components from lipid materials to produce one or more of: fatty acid alkyl esters and biodiesel.

In certain embodiments, the esterification includes using gas-phase reactions with one or more alcohols.

In certain embodiments, the esterification occurs with assistance of solid or liquid acid catalysts.

In certain embodiments, the esterification occurs without assistance of solid or liquid acid catalysts.

In certain embodiments, the method further includes: one or more steps of: recovering residue biomass, or biochar, remaining after recovery of all volatilized compounds.

In certain embodiments, the method further includes: using the biochar as one or more of: fertilizer, soil amendment and replacement of charcoal.

In certain embodiments, the biochar is combusted on site for generation of process heat.

In certain embodiments, the temperatures at one or more of the steps are distinct, non-overlapping degradation temperatures.

In certain embodiments, the method further includes: recovering non-condensable volatilized compounds as syngas.

In certain embodiments, the syngas is used as one or more of: fuel, combustion and power generation.

In certain embodiments, the biomass comprises a non-ligninaceous biomass feedstock.

In certain embodiments, the non-ligninaceous biomass feedstock comprises at least partially volatalizible combinations of one or more of: carbohydrate and protein; carbohydrate and lipid; protein and lipid; and, protein, carbohydrate and lipid.

In certain embodiments, the biomass comprises one or more of: algae, micro algae, macro algae, bacteria including cyanobacteria; fungi, and yeast.

In certain embodiments, the biomass comprises one or more of: non-lignaceous plants and plant parts, stalks, seeds.

In certain embodiments, the biomass comprises one or more of: soybean, corn, canola, jatropha and camelina.

In certain embodiments, the biomass is present as a substantially dry feedstock.

In certain embodiments, the biomass is present as an at least partially wet feedstock.

In certain embodiments, the method further includes: determining of appropriate temperatures of heating for one or more of the steps through thermogravimetric analysis (TGA).

In certain embodiments, the step of determining appropriate temperatures includes:

first, heating the biomass in a TGA instrument to determine temperature zones of most rapid mass loss by volatilization, i.e., derivative mass loss "peaks"; and second, verifying thermal fractionation by heating samples sequentially to each of the temperatures where these peaks occur, followed by an isothermal hold step until the stoppage of weight loss at each peak.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

DETAILED DESCRIPTION

Figure 1:
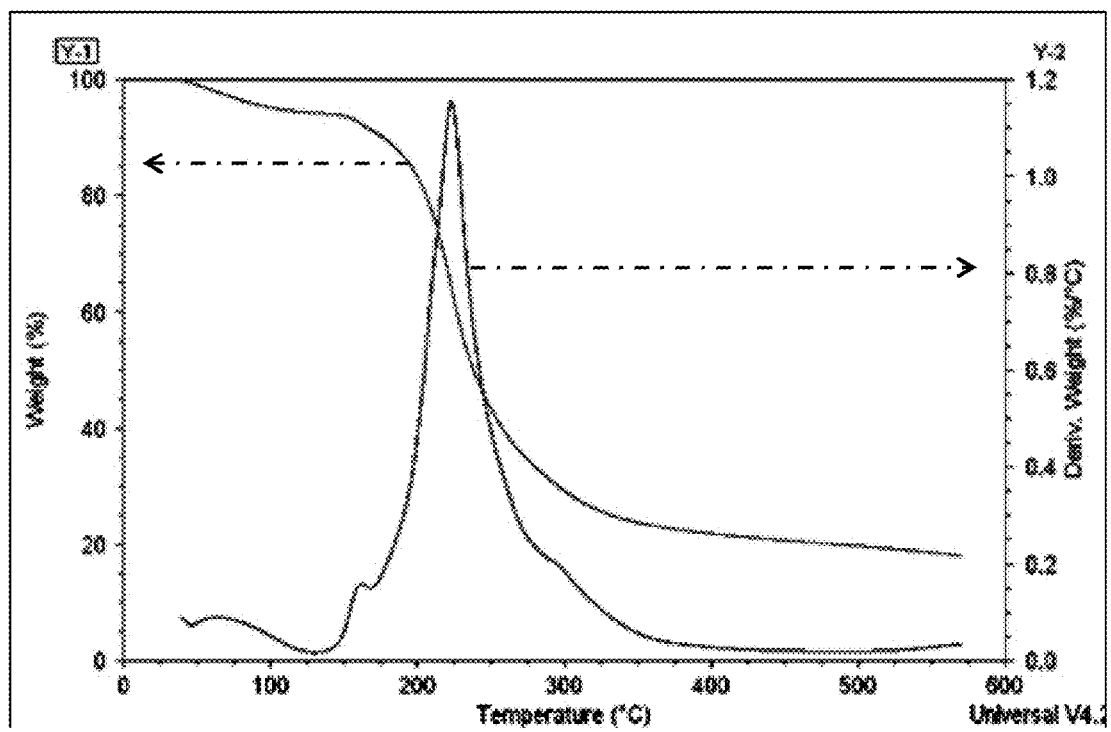
FIG. 1: Thermogram showing the thermal degradation profile of Bovine Serum Albumin (used as an example protein) as a function of temperature. The curve corresponding to the primary y-axis (left) shows the decrease in absolute sample weight (as percentage of initial mass) as a function of temperature. The curve corresponding to the secondary y-axis (right) shows the derivative of the weight loss with respect to temperature. A peak on this curve indicates the temperatures zone where the relative magnitude of weight loss is more significant than the flat parts of the curve. The axes corresponding to each curve are indicated by dashed arrows on the Figure.

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

Biomass of non-lignocellulosic origin is typically composed of one or more of three factional components—proteins, carbohydrates (such as starches) and lipids, or oils (such as triacylglycerides or other lipids).

One of the concerns with themochemical processing of protein-containing biomass is contamination of bio-oil with nitrogen-containing compounds (such as pyrozole, pyridine, maltol etc.) derived from protein. N-containing fuels are of low quality and may not pass fuel standards due to formation of NOx upon combustion. In addition, when bio-oils are upgraded through catalytic hydrogenation and deoxygenation, presence of N-compounds can poison the catalysts.

The inventors herein have now discovered that each of these biopolymer fractions exhibit narrow regions of degradation/volatilization temperatures that do not overlap with each other. The inventors herein have now developed a method to recover oil and gas individually from each of these fractions. In particular embodiments, proteins volatilize most easily followed by carbohydrates and then lipids. By first removing the easily volatilized protein, a majority of the N compounds stay associated with the protein pyrolysis products. Fuels from pyrolysis of the remaining biomass are then N-free. During practice of the thermal fractionation process described herein, the relatively low value fuel obtained from protein degradation might be used on-site to generate process heat. Alternatively, the pyrozole and pyridine like compounds may be isolated from this bio-oil fraction as precursors for N-based chemicals and polymers. It is also possible to convert bio-oil from the protein fraction into commercial fuel after N-removal such as by hydrodenitrification.

The biomass remaining after thermal removal of protein can be further processed to recover bio-oils from carbohydrates (e.g., starch) and lipids, again as separate fractions. The lipid-derived oils might need minor or no further processing. Lipids are mostly hydrocarbons with very little oxygen and therefore the pyrolysis products from this fraction would not need hydrogenation or deoxygenation. Carbohydrate or starch pyrolysis, on the other hand, produces a wide variety of pyranoses, organic acids, aldehydes and ketones most of which are oxygenated and need downstream hydrotreatment. According to the method described herein, only a fraction of the total bio-oil produced from the feedstock would require upgradation.

The char recovered at the end of the thermal fractionation process will have composition and properties similar to char resulting from traditional pyrolysis.

The inventors herein now provide evidence that thermal fractionation of non-ligninaceous biomass is feasible using an algae species (*Scenedesmus* sp.) and soybean flour. *Scenedesmus* sp. has starch and protein while soybean flour has triglycerides also. The inventors herein have now identified the temperature windows of degradation of each of these polymers through thermogravimetric analyses (TGA) where temperatures were continuously increased over time at a constant rate. The inventors herein then verified complete volatilization of each of these fractions in both biomass types by heating samples up to the degradation temperatures followed by an isothermal heating.

In TGA, samples of known weight are continuously heated at a programmed rate and the sample weight loss is monitored over time. Simultaneously, the rate of mass loss is also recorded. When the weight loss occurs rapidly (for example, at the volatilization temperature of a component) the "rate of weight loss profile" shows a peak. This peak helps identify the volatilization window for the component.

EXAMPLES

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference. The following examples are intended to illustrate certain preferred embodiments of the invention and should not be interpreted to limit the scope of the invention as defined in the claims, unless so specified.

The value of the present invention can thus be seen by reference to the Examples herein.

Example 1

Thermal Degradation Temperature Ranges for Illustrative Protein, Carbohydrates and Lipids In this example, the inventors herein now establish that each of these biopolymers degrade over non-overlapping temperature ranges.

FIG. 1 is a thermogram of Bovine Serum Albumin which shows that this protein volatilizes between 180 and 240° C.

Figure 2:
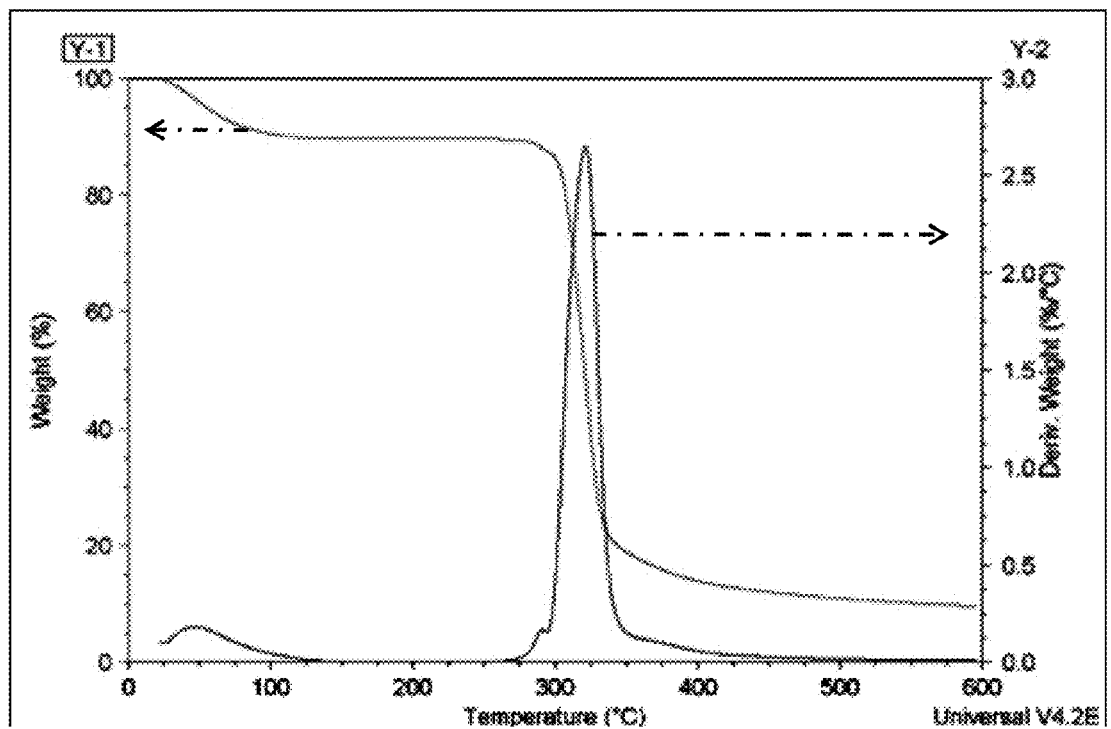
FIG. 2: Thermogram showing the thermal degradation profile of corn starch (used as an example carbohydrate) as a function of temperature. The curve corresponding to the primary y-axis (left) shows the decrease in absolute sample weight (as percentage of initial mass) as a function of temperature. The curve corresponding to the secondary y-axis (right) shows the derivative of the weight loss with respect to temperature. A peak on this curve indicates the temperatures zone where the relative magnitude of weight loss is more significant than the flat parts of the curve. The axes corresponding to each curve are indicated by dashed arrows on the Figure.

FIG. 2 shows the TGA profile for corn starch, an example carbohydrate, which volatilizes between 300 and 350° C.

Figure 3:
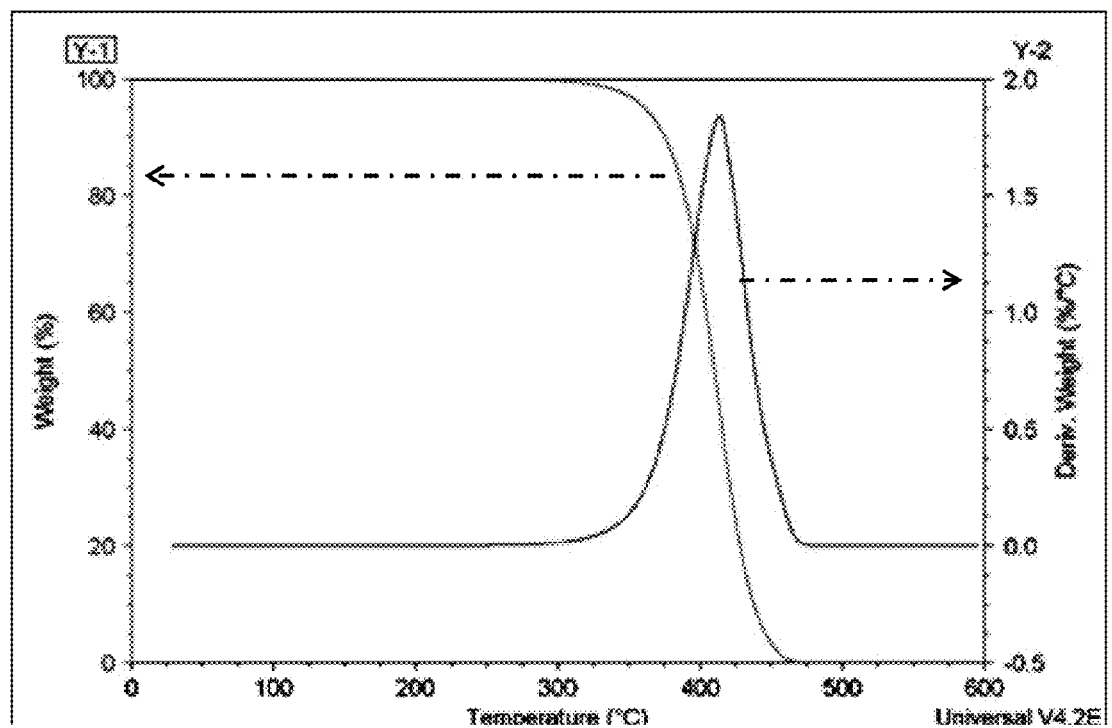
FIG. 3: Thermogram showing the thermal degradation profile of soybean oil (used as an example lipid) as a function of temperature. The curve corresponding to the primary y-axis (left) shows the decrease in absolute sample weight (as percentage of initial mass) as a function of temperature. The curve corresponding to the secondary y-axis (right) shows the derivative of the weight loss with respect to temperature. A peak on this curve indicates the temperatures zone where the relative magnitude of weight loss is more significant than the flat parts of the curve. The axes corresponding to each curve are indicated by dashed arrows on the Figure.

Finally, FIG. 3 shows the results of the thermogravimetric analysis of soy oil, an example lipid. Lipids degrade at a much higher temperature of 370 to 480° C. These thermograms clearly establish that proteins, carbohydrates and lipids undergo pyrolysis in distinct, non-overlapping temperature regimes.

Example 2

Thermal Fractionation of a Carbohydrate-Rich Green Alga (*Scenedesmus* sp.)

This species of fast growing microalgae was grown in an outdoor photobioreactor. The inventors herein determined that 25% (w/w) of *Scenedesmus* sp. was protein, 40% (w/w) was starch, 8% lipid and the remaining as ash and other minor biopolymers (such as sterols, phytols, etc.). The proximate analysis (Table 1) of this biomass shows that nearly 60% of the carbon can be volatilized.

TABLE 1

| Proximate analysis of *Scenedesmus* sp. | |
|---|---|
| Moisture content (wt %) | 2.2 |
| Volatile matter (wt %) | 59.2 |
| Fixed carbon (wt %) | 20.7 |
| Ash (wt %) | 17.9 |

Figure 4:
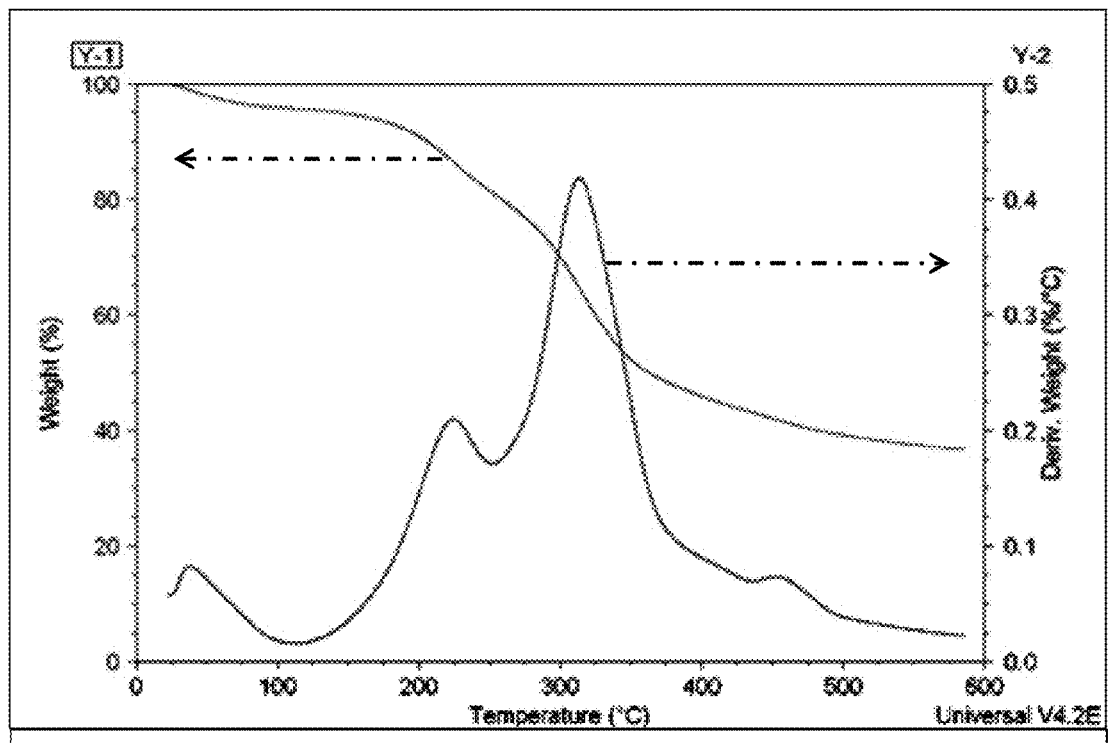
FIG. 4: Thermogram showing the thermal degradation profile of *Scenedesmus* sp. (used as an example biomass that contains both protein and carbohydrate) as a function of temperature. The curve corresponding to the primary y-axis (left) shows the decrease in absolute sample weight (as percentage of initial mass) as a function of temperature. The curve corresponding to the secondary y-axis (right) shows the derivative of the weight loss with respect to temperature. A peak on this curve indicates the temperatures zone where the relative magnitude of weight loss is more significant than the flat parts of the curve. The axes corresponding to each curve are indicated by dashed arrows on the Figure.

Thermogravimetric analyses of dry *Scenedesmus* sp. samples of are shown in FIG. 4. In this experiment, temperature was continuously increased to 600° C. at fixed rate of 10° C./min. Three distinct peaks were seen in these TGA profiles at 220, 300 and 450° C. Based on the data from Example 1, these peaks can be attributed to the pyrolysis of protein, carbohydrate and lipid, respectively. The observations for pure model compounds correlate well with a biomass that comprises of these biopolymers. Moreover, the temperature windows of each component are reasonably well separated to enable separate recovery of the pyrolysis products corresponding to each biopolymer class.

Figure 5:
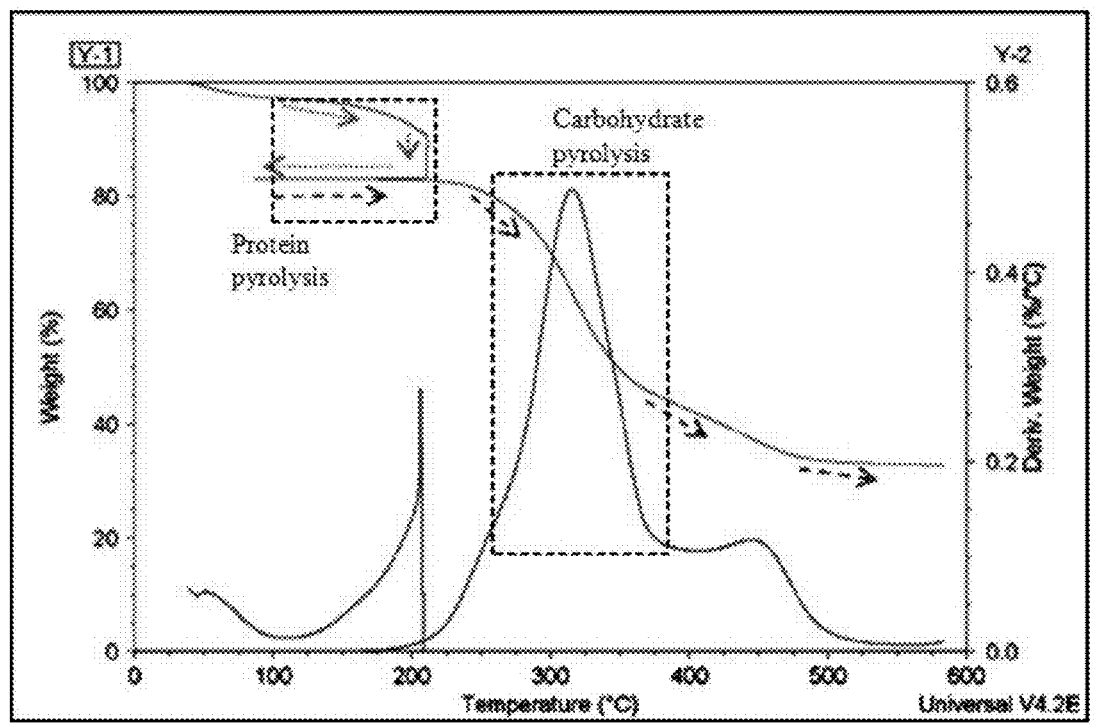
FIG. 5: Thermogram showing separate volatilization of the protein and carbohydrate fraction with *Scenedesmus* sp. upon application of a "thermal fractionation protocol." The arrows indicate the sequence of temperature events for this sample—(i) initial heating to 210° C.; (ii) hold at 210° C. until volatilization of the protein fraction is complete; (iii) cooling down and reheating sample to verify absence of peak at 210° C.; and, (iv) re-heating to volatize carbohydrates.

Based on the TGA profile in FIG. 4, the thermal fractionation of *Scenedesmus* sp. was carried out using the following protocol (called "thermal fractionation protocol" hereafter):

Initially, the temperature of a *Scenedesmus* sp. sample was increased up to 210° C. This temperature was maintained for 10 min by which time no further weight loss was observed suggesting that protein pyrolysis was complete. This was verified by then cooling the samples back to room temperature and re-heating (see boxed region marked "protein pyrolysis" in FIG. 5 and the arrows in the box).

In this second stage heating, the peak corresponding to protein at 220° C. is absent (compare the derivative weight loss profiles in FIG. 4 and FIG. 5) confirming the removal of pyrolyzable proteins. Thereafter, further heating resulted in pyrolysis of starch at 300° C. suggesting that the removal of protein and prolonged exposure to the lower temperatures did not have any effect on the carbohydrate fraction (peaks are at similar temperatures in FIG. 4 and FIG. 5).

Thus, removal of pyrolyzable protein leaves behind a biomass fraction that is largely carbohydrate and the bio-oil resulting from the pyrolysis of this residue is essentially N-free and is hence of higher quality than the bio-oil from pyrolysis of the original feedstock.

Example 3

Thermal Fractionation of Soy Bean Flour Containing Protein, Carbohydrate as Well as Lipid Soy flour was chosen as an example feedstock to demonstrate thermal fractionation of biomass that contains all three major non-lignin biopolymers—proteins, carbohydrates and lipids. As such, this approach will also be applicable to oleaginous algae.

Figure 6:
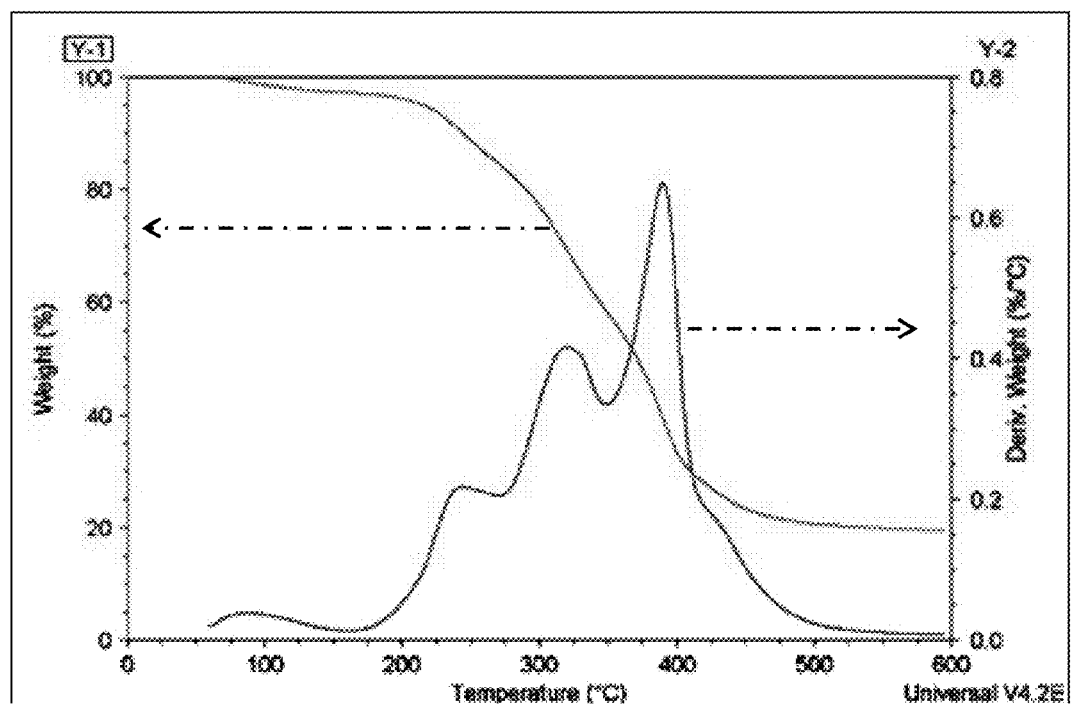
FIG. 6: Thermogram showing the thermal degradation profile of soybean flour (used as an example biomass that contains protein, carbohydrate and lipids) as a function of temperature. The curve corresponding to the primary y-axis (left) shows the decrease in absolute sample weight (as percentage of initial mass) as a function of temperature. The curve corresponding to the secondary y-axis (right) shows the derivative of the weight loss with respect to temperature. A peak on this curve indicates the temperatures zone where the relative magnitude of weight loss is more significant than the flat parts of the curve. The axes corresponding to each curve are indicated by dashed arrows on the Figure.

Similar to Example 2, traditional pyrolysis was first carried out using a constant heating rate of 10° C./min. This TGA profile is shown in FIG. 6. Three peaks can be seen at 250, 320 and 400° C.—each corresponding to protein, starch and lipid within the temperature windows identified in Example 1.

Figure 7:
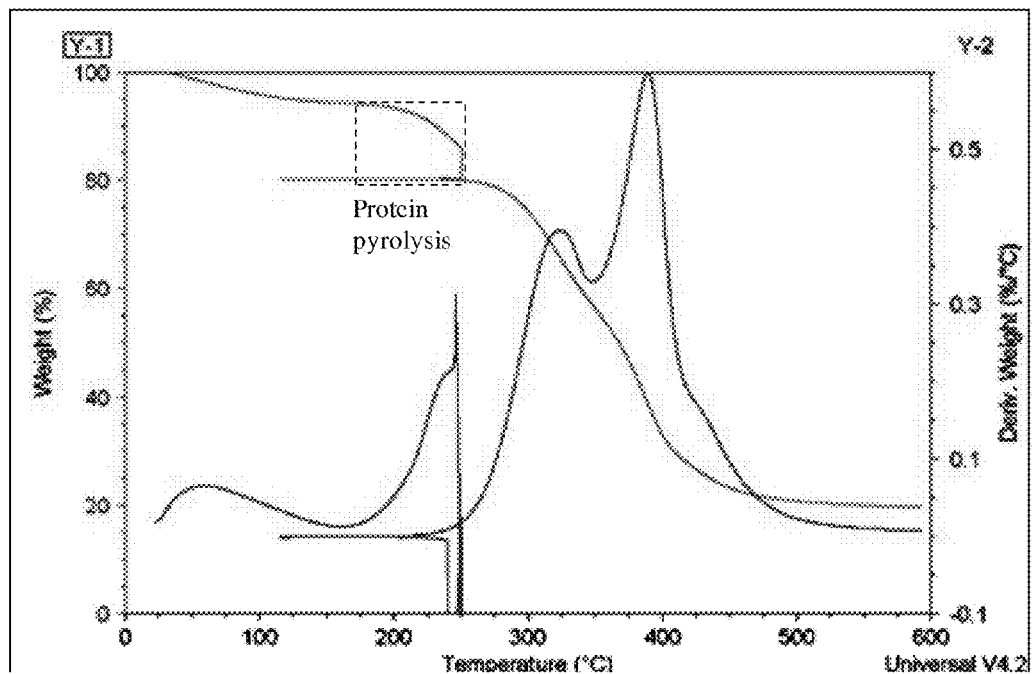
FIG. 7: Thermogram showing volatilization of the protein fraction alone from soybean flour (used as an example biomass that contains protein, carbohydrate and lipids) upon application of a "thermal fractionation protocol." The removal of protein at the lower temperature does not influence the thermal properties of the remaining biopolymers—carbohydrate and lipid.

For this feedstock, the thermal fractionation protocol was implemented twice—first to pyrolyze proteins and then to pyrolyze starch. As seen in FIG. 7, heating up to 250° C. followed by isothermal heating at this temperature for 10 min results in protein pyrolysis. Then cooling sample back to 45° C. and reheating confirms the complete removal of pyrolyzable proteins. Further heating to 320° C. and maintaining isothermal conditions results in pyrolysis of starch. As before, cooling the sample back to 45° C. and reheating shows that the starch fraction was also removed, along with protein (FIG. 8).

Figure 8:
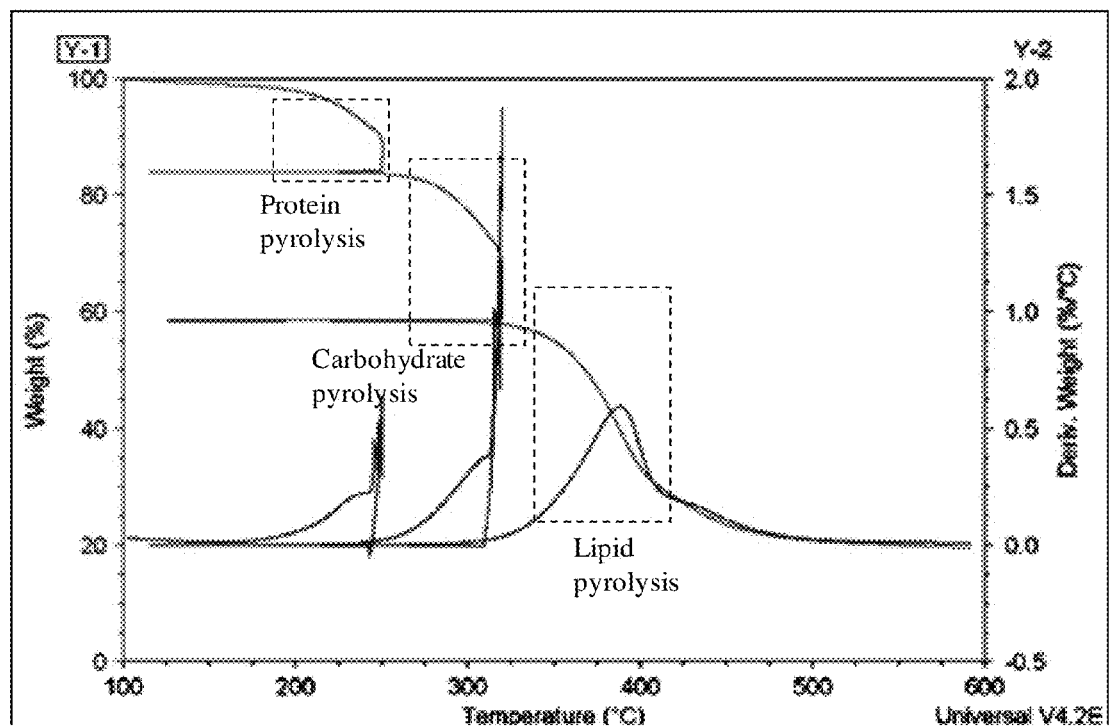
FIG. 8: Thermogram showing volatilization and separate recovery of the protein. carbohydrate and lipid from soybean flour (used as an example biomass that contains protein, carbohydrate and lipids) upon application of a "thermal fractionation protocol."

Further heating beyond 320° C. results in volatilization and pyrolysis of the triglyceride (lipid) fraction (also shown in FIG. 8). Thus, for biomass that contains protein starch and lipids, a thermal fractionation approach is useful to derive component-specific bio-oils that would have a higher degree of homogeneity that would facilitate production of multiple high grade fuels upon subsequent processing, as described below.

Example 4

Conversion of Triglycerides to Free Fatty Acids Upon Volatilization

We demonstrated that triglycerides from soy oil are decomposed into their constituent free fatty acids upon heating to temperatures slightly above their boiling point (370° C.) followed by rapid re-condensation to near-ambient temperatures. In these experiments, soy oil was heated in a round bottom flask that was connected to an overhead condenser cooled with ice-cold water. The soy oil-containing flask was maintained at a constant temperature of 370° C. An inert atmosphere was maintained in the system by continuous purging with nitrogen. Nitrogen also served as the carrier gas for the vapors and based on gas flow rates used, the residence time of the hot vapors were less than 5 s resulting in conditions of fast-pyrolysis. Composition of the initial oil, condensed vapors and residual oil was measured using gas chromatography (GC) techniques with the aid of a flame ionization detector (FID). A Restek Biodiesel capillary column was used to separate the various lipid components.

Figure 9:
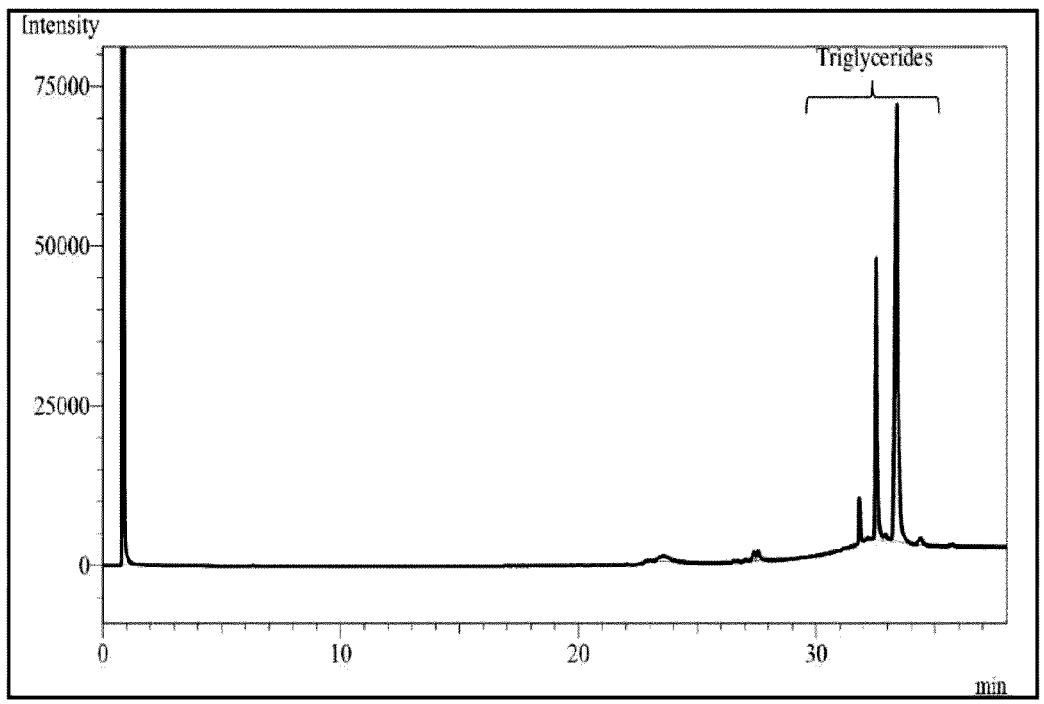
FIG. 9: Gas chromatograph of untreated soy oil (used as an example lipid) showing that the majority of the lipids are in the form of triglycerides eluting between 30-35 min.
Figure 11:
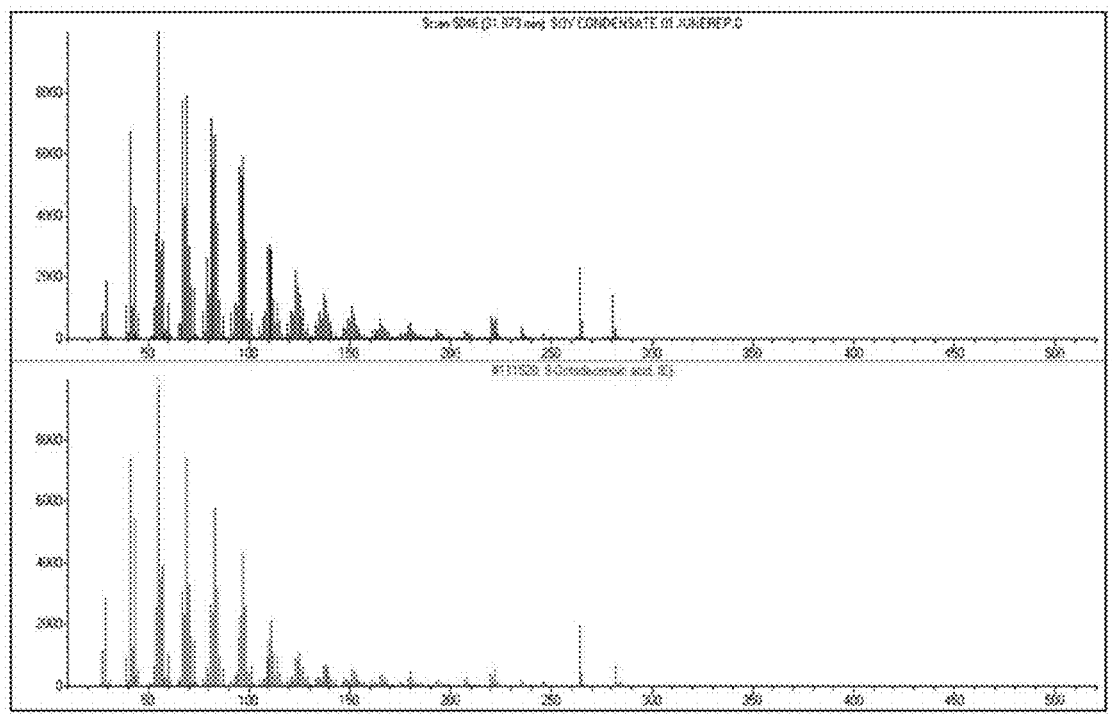
FIG. 11: Mass spectrograph of soy oil (used as an example lipid) condensate confirming production of oleic acid as one major product of the thermal treatment.
Figure 12:
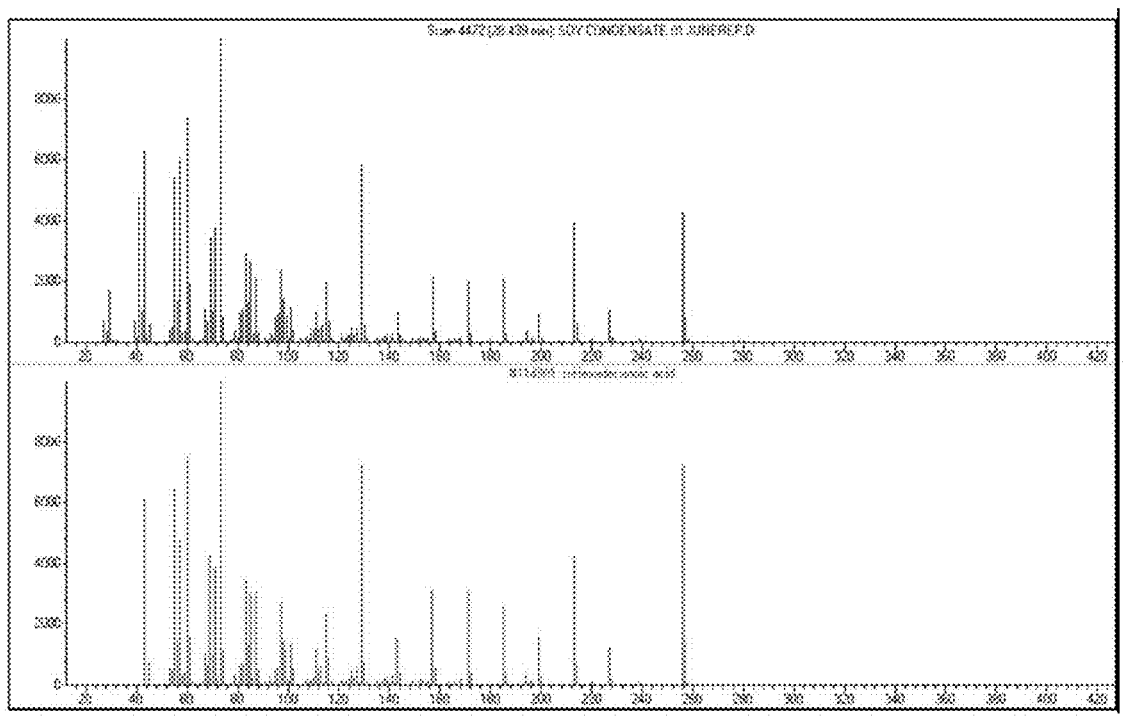
FIG. 12: Mass spectrograph of soy oil condensate confirming production of hexadecanoic acid as the second major product of the thermal treatment.

FIG. 9 shows that the lipids in the soy oil feedstock were primarily triglycerides eluting between 30-35 min. However, after our low-temperature pyrolysis, nearly all the triglycerides were converted into shorter chain fatty acids or hydrocarbons as shown in the GC chromatogram of the condensate in FIG. 10 and confirmed by mass spectrometry (GC-MS) results shown in FIG. 11 and FIG. 12.

Figure 10:
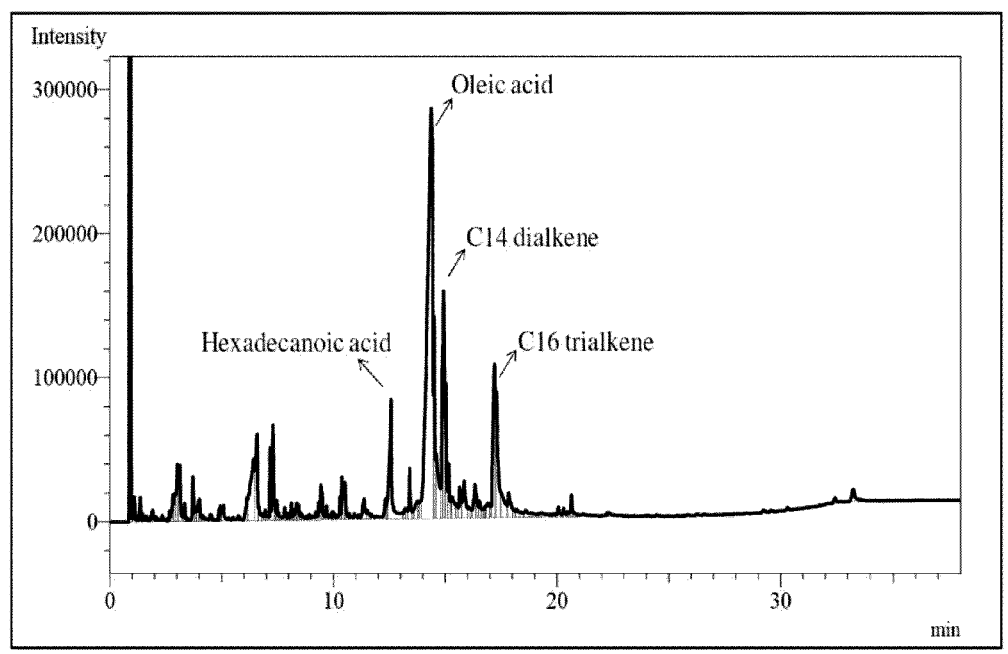
FIG. 10: Gas chromatographs of soy oil (used as an example lipid) subjected to isothermal heating at 37° C. followed by condensation of the vapors. These results show conversion of the native triglycerides to lower molecular weight fatty acids and hydrocarbons.

Soy oil primarily contains triglycerides comprising of oleic (C18:1, ~23%), linoleic (C18:2, ~51%), α-linolenic acid (C18:3, ~7-10%), palmitic acid (C16:0, 10%) and stearic acid (C18:0, 4%) side chains. The data in FIG. 10 shows that vaporization and rapid cooling results in formation of free oleic acid, hexadecanoic acid, decenoic acid as well as hydrocarbons such as C14 dialkene and C16 trialkene.

Example 5

Figure 13:
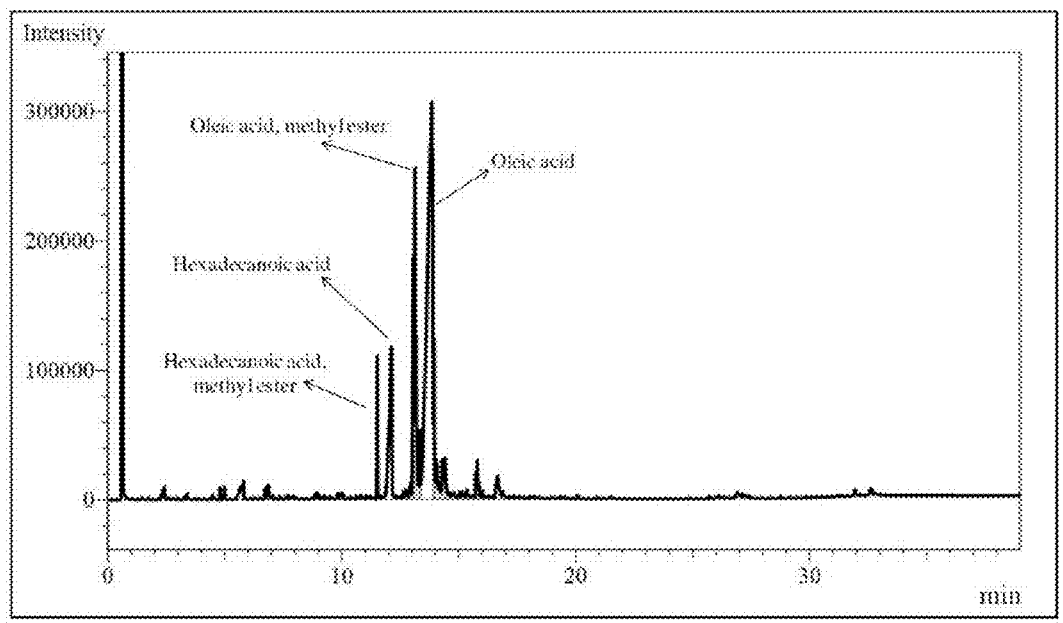
FIG. 13: Gas chromatograph of the product mixture resulting following non-catalytic vapor phase reaction between soy oil—and methanol-vapors.
Figure 14:
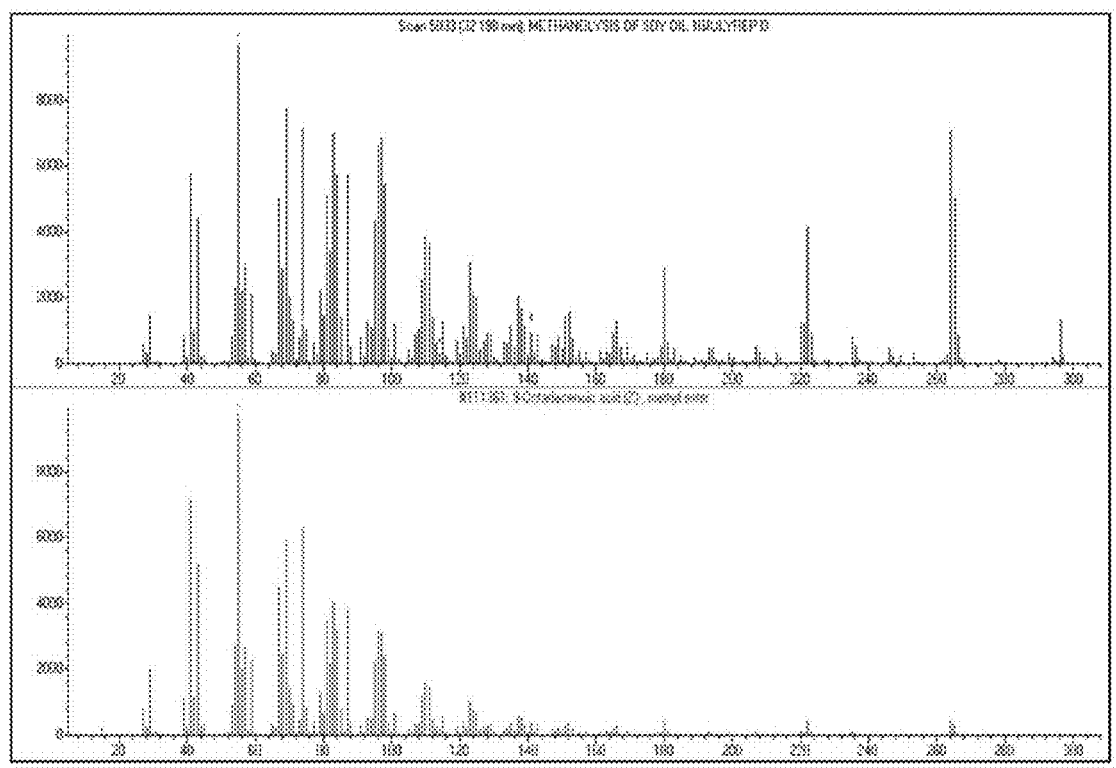
FIG. 14: Mass spectrograph of condensate from vapor phase reaction confirming production of oleic acid methyl ester.
Figure 15:
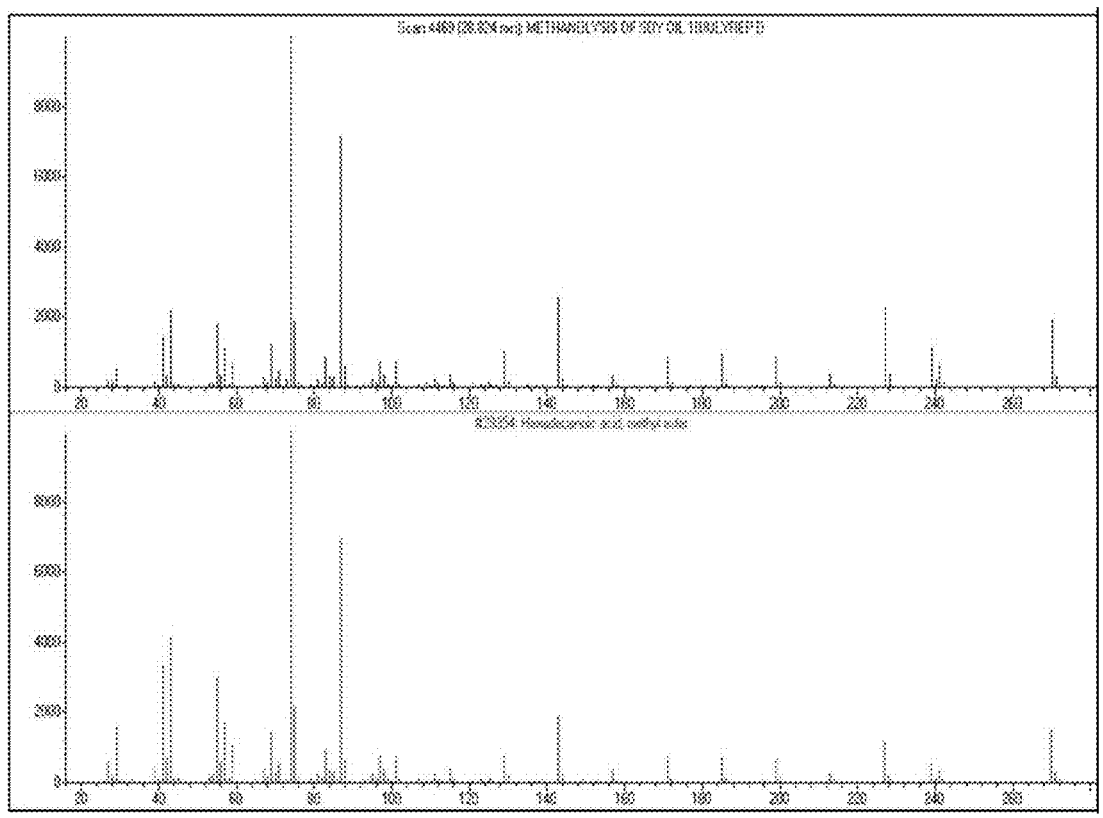
FIG. 15: Mass spectrograph of condensate from vapor phase reaction confirming production of hexadecanoic acid methyl ester.

Vapor Phase Esterification of Free Fatty Acids to Methyl Esters without the Use of a Catalyst In this example we showed that free fatty acids can be easily converted into fatty acid methyl esters (FAMEs, the primary constituent of biodiesel) through simple vapor-phase esterification with methanol (see FIGS. 13, 14 and 15). Unlike conventional esterification reactions which require a catalyst and up to an hour or longer reaction times, our method accomplishes the same reaction within a few seconds without needing any catalyst. In the example shown the reaction time was ~5 s and about 40% yield of the ester products was obtained.

Further, since esterification is an endothermic reaction, the higher temperatures would result in an increase in the equilibrium constant of the reaction. Thus, under these reaction conditions, addition of large excess reactant alcohol would not be required to achieve high conversions—which is a common practice in traditional acid or base catalyzed transesterification.

In addition, traditional biodiesel production from oleaginous biomass (such as lipid-rich algae) requires several processing steps of lipid extraction, acid or base catalyzed transesterification, as well as solvent- and catalyst-recovery. In contrast, the method described herein eliminates the need for these multiple unit operations. If required, solid acid catalysts could easily be incorporated into this process such by passing the reactant vapors through catalyst beds. Such catalysts are commercially available and stable over long periods without deactivation. Process steps associated with recovery of soluble homogenous catalysts are eliminated by this approach thereby lowering process costs. Product purification steps could also be minimized or even eliminated with the method described herein since the product predominantly consists of hydrocarbons. (In contrast, traditional biodiesel production often requires washing of the transesterified lipids with water to remove impurities such as glycerol that affect engine performance and life).

Similar to the FAMEs production described above, free fatty acid (FFA) vapors can serve as a platform substrate that can also be converted to fatty alcohols, value-added oleochemicals and drop-in fuels through facile vapor-phase chemical transformations.

Overall, use of this thermal fractionation approach to non-ligninaceous biomass results in conversion of a greater fraction of feedstock carbon into fuels. Since each biopolymer is converted separately, efficient fuel upgradation steps tailored to biopolymer-specific boils can be accomplished using the method described herein. The biomass nitrogen can be contained to only one fraction of the overall bio-oil, thereby resulting in higher quality fuels from the rest of the material. For oleaginous biomass, the bio-oil from the lipid fraction, after online vapor-phase esterification, can be used directly with minimal, if any, further purification or processing.

Example 5

Production of Upgraded Bio-Oils by Continuous In-Line Hydrogenation of Pyrolysis Vapors (Hydropyrolysis)

The inventors herein performed experiments where the pyrolysis vapors were subjected to continuous hydrogenation. These studies confirmed that deoxygenated hydrocarbon products (suitable as direct petroleum fuel replacements) can be produced by this method. These studies were carried out with three separate algae species—(a) *Ankistrodesmus* sp., (b) *Scenedesmus* sp. and (c) *Cladophora* sp. to confirm the applicability of this method to a wide variety of algal biomass types. The experiments were performed in a Pyroprobe 5200 pyrolysis GC mass spectrometer (Py-GC/MS) (CDS Analytical, Oxford, Pa.) that was also equipped with an inline high pressure fixed bed catalytic reactor (containing Pt catalyst) for continuous hydrogenation of the pyrolyzed vapors. Four experiments were carried out ((i) through (iv), Table 2) with each algal sample at varying $H_2$ pressures and catalytic bed temperatures to demonstrate the progressive effectiveness of the inline hydrogenation method for production of hydrocarbon fuels with increasing severity of operating conditions.

TABLE 2

Experimental conditions for hydropyrolysis experiments

| Experiment # | Pyrolysis temp. (° C.) | Hydrogenation reactor temp. (° C.) | Hydrogen pressure (psi) |
|---|---|---|---|
| (i) | 600 | 50 | 0† |
| (ii) | 600 | 50 | 20 |
| (iii) | 600 | 300 | 100 |
| (iv) | 600 | 400 | 300 |

†Helium used as purge gas at atmospheric pressure

The pyrolysis reactor was set at 600° C. for all experiments. Results of these experiments ((i) through (iv)) for *Ankistrodesmus* sp., *Scenedesmus* sp. and *Cladophora* sp are shown in FIGS. 16, 17 and 18, respectively.

Figure 16:
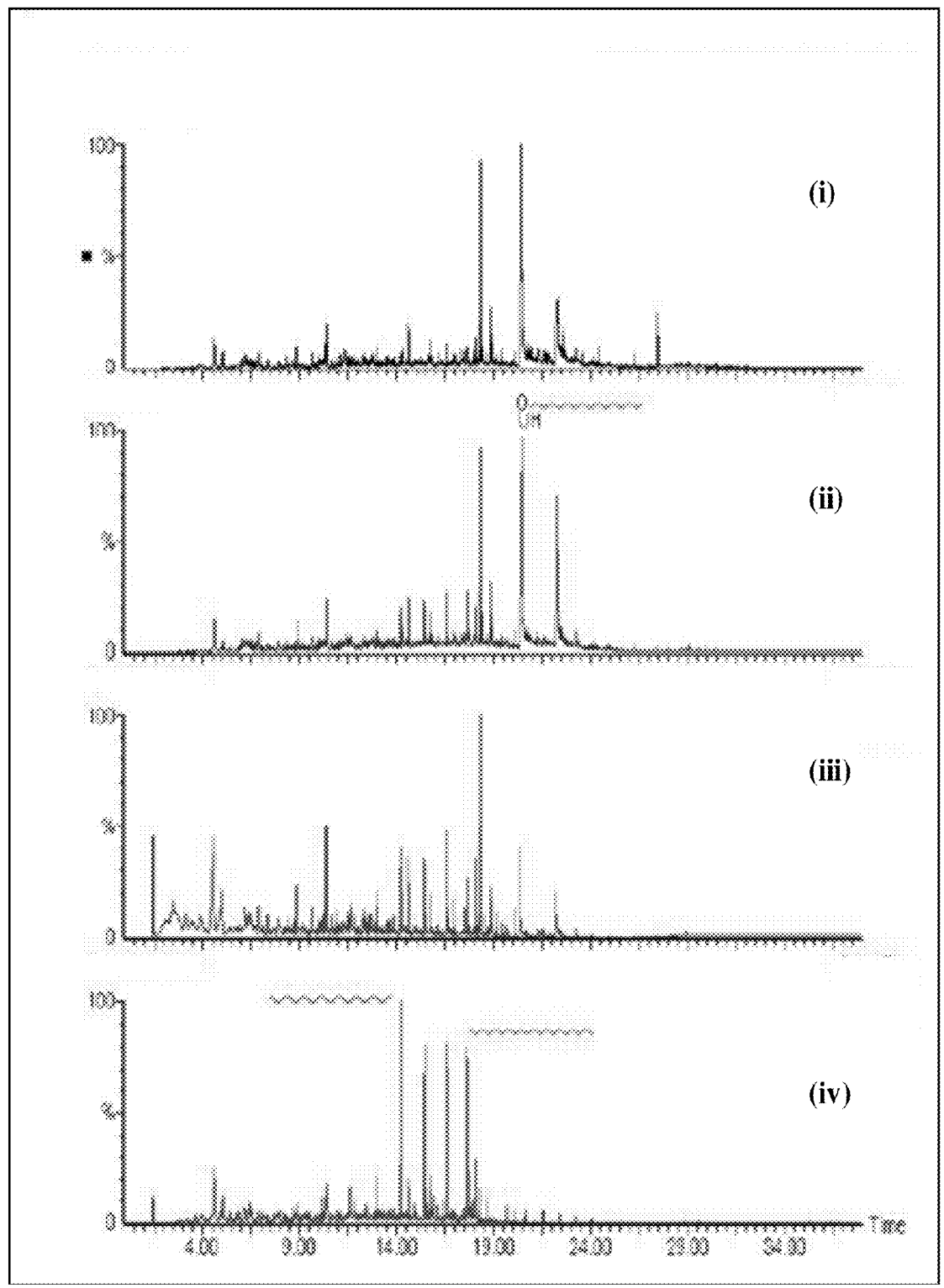
FIG. 16: Gas chromatograph of products resulting from thermal treatment of *Ankistrodesmus* sp. in the absence and presence of hydrogen. Some compounds are indicated in the figure to show progressive deoxygenation and hydrogenation of the bio-oil products with increasing treatment severity.
Figure 17:
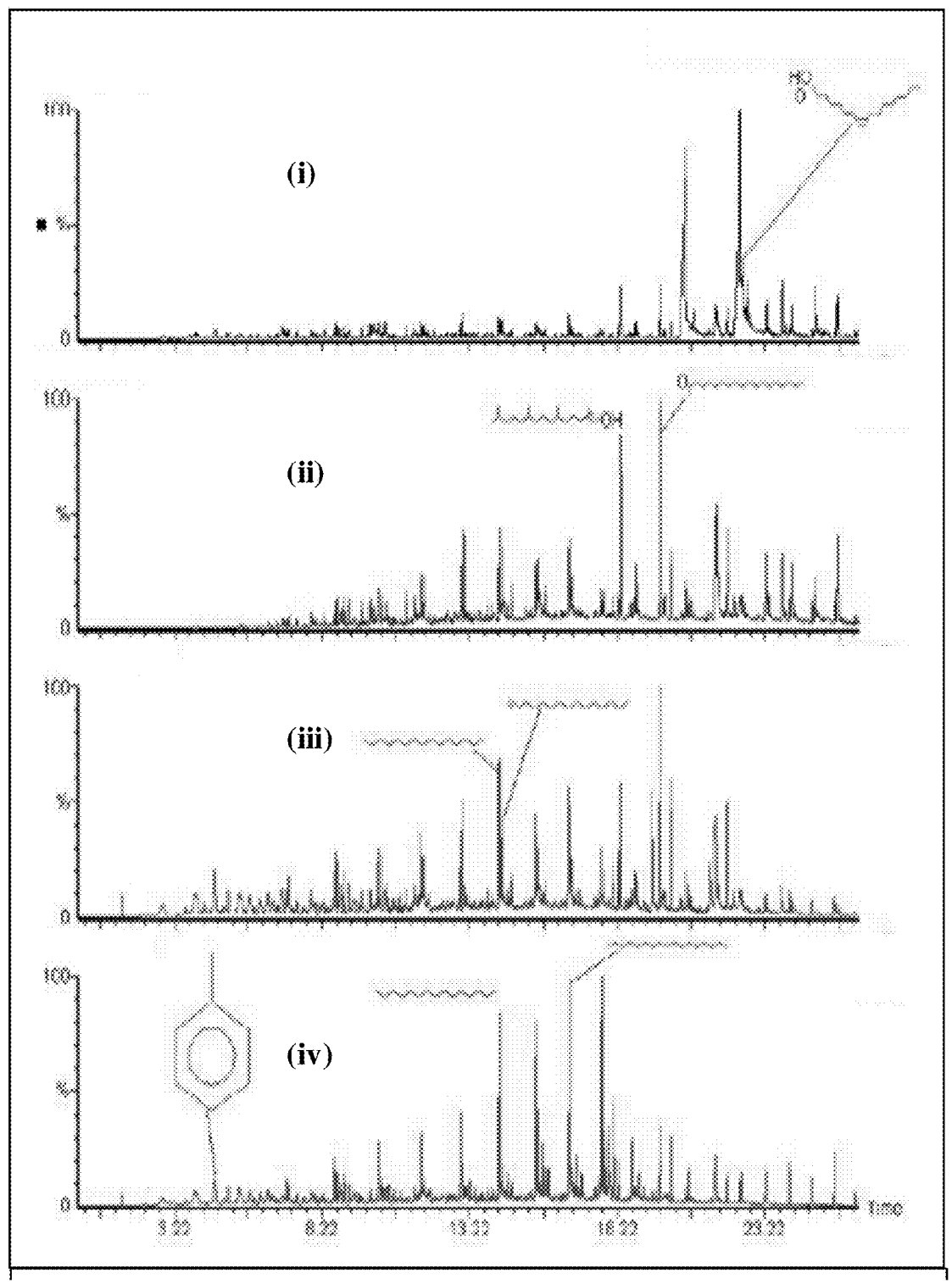
FIG. 17: Gas chromatograph of products resulting from thermal treatment of *Scenedesmus* sp. in the absence and presence of hydrogen. Some compounds are indicated in the figure to show progressive deoxygenation and hydrogenation of the bio-oil products with increasing treatment severity.
Figure 18:
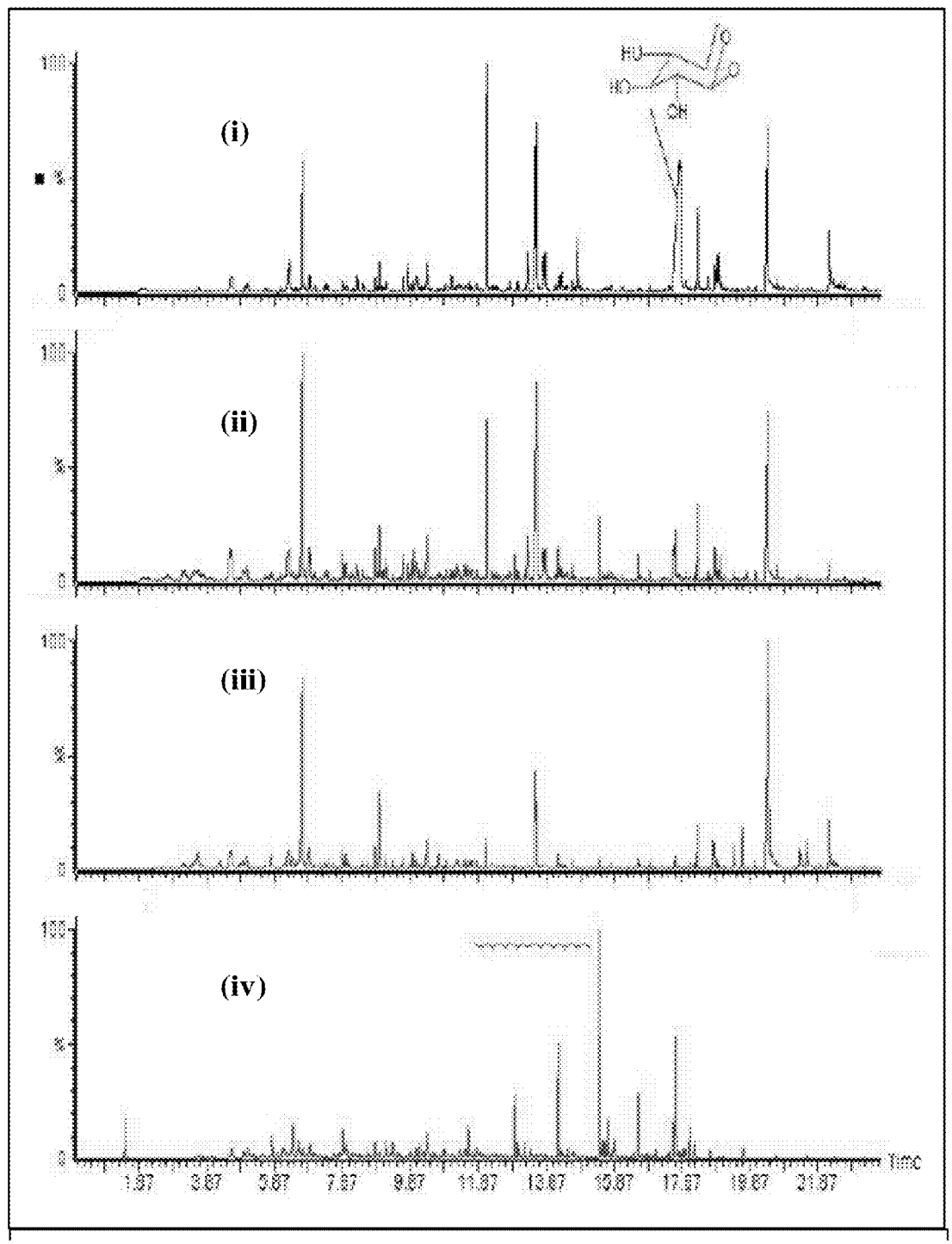
FIG. 18: Gas chromatograph of products resulting from thermal treatment of *Cladophora* sp. in the absence and presence of hydrogen. Some compounds are indicated in the figure to show progressive deoxygenation and hydrogenation of the bio-oil products with increasing treatment severity.

With each algal biomass type, products of pyrolysis alone (carried out in the absence of $H_2$, part (i) of FIGS. 16, 17 and 18) or pyrolysis in low pressure $H_2$ (part (ii) of FIGS. 16, 17 and 18) showed the presence of oxygenated compounds. When the experiments were performed under conditions conducive to catalytic hydrogenation (parts (iii) and (iv) of FIGS. 16, 17 and 18), straight chain hydrocarbons or aromatic compounds were produced and the oxygenated compounds were dramatically reduced. These results clearly show that bio-oils obtained by integrating thermal treatment of non-ligninaceous biomass (including algae) with catalytic hydrogenation result in hydrocarbon fuels similar to those derived from petroleum.

Example 6

Bio-Refinery Design

Figure 19:
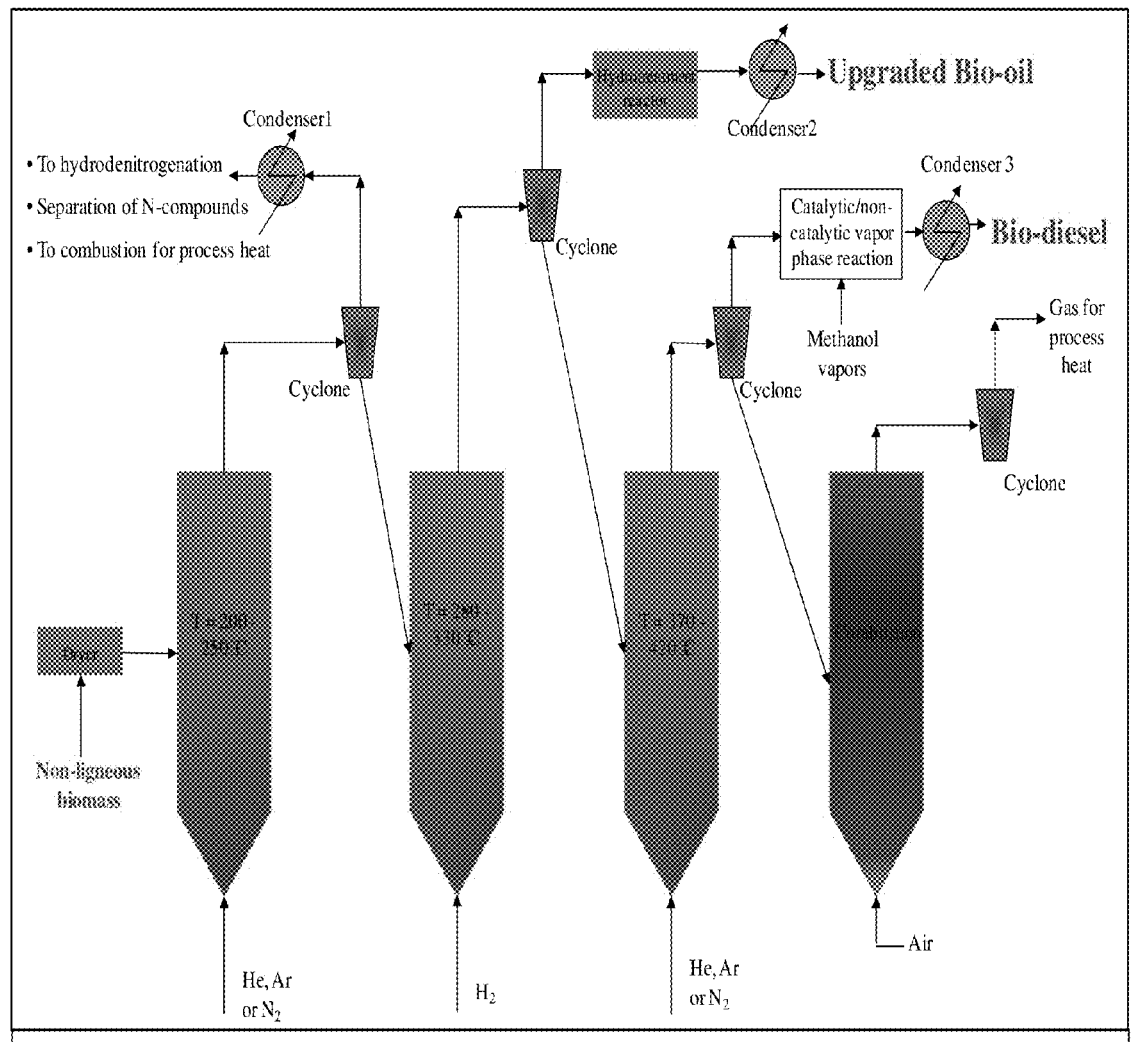
FIG. 19: Schematic illustration of a process design of a thermal fractionation process of a feedstock containing proteins, carbohydrates and lipids. The process design shows strategies to recover multiple infrastructure-compatible fuels and co-products through an integrated process.

FIG. 19 shows a schematic illustration of a process design with three reactors (fixed or fluidized beds) each operating at the fractionation temperature of each of the three biopolymers—protein, carbohydrate and lipid. The products from protein volatilization, rich in N-compounds, can be upgraded to fuel quality through hydrodenitrogenation followed by hydrogenation.

Alternatively, the crude bio-oil from this fraction can be combusted for process heat. High value N-compounds can also be recoverable from this fraction through downstream separation steps. Solids from the first reactor are shown to be pneumatically transported into the second reactor that operates at the volatilization temperature of carbohydrates. By integration with a hydrotreatment system, this reactor can directly produce an infrastructure-compatible green diesel or green gasoline. The lipid rich residue from this reactor can be volatilized to produce free fatty acids vapors in the third reactor. Vapor phase alcoholysis of the products from this reactor can result in the production of biodiesel—also compatible with existing infrastructure. The residue remaining at the end could be combusted to generate process heat or could be recovered as biochar for use as fertilizer/soil amendment.

Example 7

Non-Limiting Examples of Uses

The method described herein is especially useful for the cost effective conversion of algal- and other non-ligninaceous biomass to infrastructure compatible liquid fuels.

The method is also especially useful in bio-refineries, petroleum industries and biofuel manufacturers.

The method is therefore broadly useful for the production of liquid transportation fuels. As such, the size of the market for this product is immensely large While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

The publication and other material used herein to illuminate the invention or provide additional details respecting the practice of the invention, are incorporated by reference herein, and for convenience are provided in the following bibliography.

Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

What is claimed is:

1. A method of pyrolytic thermal fractionation of microalgae biomass comprising a protein component, a carbohydrate component, and a triglyceride component, comprising:
   a) heating the microalgae biomass to a first volatilization temperature of a first component comprising protein materials, and holding said first volatilization temperature of the heated microalgae biomass constant for a first period of time until no further mass loss of said first component occurs, thereby producing a first volatilized compound derived from the protein materials, wherein said first volatilization temperature is in the range of 180° C. to 240° C.;
   b) removing and recovering said first volatilized compound from the microalgae biomass remaining from step (a);
   c) heating the microalgae biomass remaining from step (b) to a second volatilization temperature of a second component comprising carbohydrate materials, and holding the second volatilization temperature of the heated microalgae biomass constant for a second period of time until no further mass loss of said second component occurs, thereby producing a second volatilized compound derived from the carbohydrate materials, wherein said second volatilization temperature is in the range of 300° C. to 350° C.;
   d) removing and recovering said second volatilized compound from the microalgae biomass remaining from step (c);
   e) heating the microalgae biomass remaining from step (d) to a third volatilization temperature of a third component comprising triglycerides, and holding the third volatilization temperature of the heated biomass constant for a third period of time until no further mass loss of said third component occurs, thereby producing a third volatilized compound derived from the triglycerides, wherein said third volatilization temperature is in the range of 370° C. to 480° C.; and
   f) removing and recovering said third volatilized compound from the microalgae biomass remaining from step (e).

2. The method of claim 1, further comprising purging one or more steps with at least one purge gas and allowing the at least one inert gas to continuously remove one or more of said first, second, or third volatilized compounds being generated.

3. The method of claim 2, wherein said at least one purge gas is $H_2$, wherein said $H_2$ achieves simultaneous and at least partial, hydrogenation of the first, second, or third volatilized compounds.

4. The method of claim 2, further comprising maintaining a flow rate of said at least one inert purge gas such that residence times of said first, second, or third volatilized compounds resulting from said microalgae biomass are 2 seconds or less.

5. The method of claim 1, wherein said period of time is 10 minutes to increase production of the first, second, or third volatilized compounds.

6. The method of claim 1, further comprising condensing at least one of said first, second, or third volatilized compounds to produce one or more bio-oils.

7. The method of claim 1, further comprising: passing said first volatilized compounds derived from the protein materials through a hydro-denitrification process to remove nitrogen-containing compounds selected from the group consisting of indoles, pyrroles, and pyrimidenes.

8. The method of claim 1, further comprising: subjecting said first volatilized compound derived from the protein materials to downstream purification to recover nitrogen containing compounds selected from the group consisting of indoles, pyrroles, and pyrimidenes.

9. The method of claim 1, further comprising: combusting said first volatilized compounds derived from the protein materials for recovery of process heat.

10. The method of claim 1, further comprising:
   i) mixing said second volatilized compounds derived from the carbohydrate materials with $H_2$ to form a mixture;
   ii) passing said mixture of step i) through a catalytic reactor to cause one or more of hydrogenation and deoxygenation of said second volatilized compounds to occur; and
   iii) condensing the hydrogenated and/or deoxygenated second volatilized compounds with step ii) to form vehicle-ready fuel.

11. The method of claim 10, wherein said hydrogenation and condensing steps occur in a single integrated system.

12. A method of fatty acid alkyl ester production comprising:
   a) heating a microalgae biomass comprising a protein component, a carbohydrate component, and a triglyceride components to a first volatilization temperature of a first component comprising protein materials, and holding said first volatilization temperature of the heated microalgae biomass constant for a first period of time until no further mass loss of said first component occurs, thereby producing a first volatilized compound derived from the protein materials, wherein said first volatilization temperature is in the range of 180° C. to 240° C.;
   b) removing and recovering said first volatilized compound from the microalgae biomass remaining from step (a);
   c) heating the microalgae biomass remaining from step (b) to a second volatilization temperature of a second component comprising carbohydrate materials, and holding said second volatilization temperature of the heated biomass constant for a second period of time until no further mass loss of said second component occurs, thereby producing a second volatilized compound derived from the carbohydrate materials, wherein said second volatilization temperature is in the range of 300° C. to 350° C.;
   d) removing and recovering said second volatilized compound from the microalgae biomass remaining from step (c);
   e) heating the microalgae biomass remaining from step (d) to a third volatilization temperature of a third component comprising triglycerides, and holding said third volatilization temperature of the heated biomass constant for a third period of time until no further mass loss of said third component occurs, thereby producing a third volatilized compound derived from the triglycerides, wherein said third volatilization temperature is in the range of 370° C. to 480° C.;
   f) removing and recovering said third volatilized compound from the microalgae biomass remaining from step (e); and
   g) esterifying said third volatilized compound to produce one or more of: fatty acid alkyl esters and biodiesel.

13. The method of claim 12, wherein said esterifying step (q) comprises using gas-phase reactions with one or more alcohol vapors.

14. The method of claim 13, wherein said esterifying step (q) the esterification occurs with assistance of solid or liquid catalysts.

15. The method of claim 13, wherein said esterifying step (g) occurs without assistance of catalysts.

16. The method of claim 1, further comprising one or more steps of: recovering biochar remaining after said recovery of said first, second, and third volatilized compounds.

17. The method of claim 16, further comprising using said biochar as one or more of: fertilizer, soil amendment, and replacement of charcoal.

18. The method of claim 16, further comprising combustion of said biochar on site for generation of process heat for one or more steps of (a)-(f).

19. The method of claim 6, further comprising recovering non-condensable volatilized compounds as syngas.

20. The method of claim 19, wherein said syngas is used as one or more of: fuel, combustion and power generation, or converted to liquid fuels by Fischer-Tropsch processes.

21. The method of claim 1, wherein said microalgae biomass is a dry feedstock.

22. The method of claim 1, wherein said microalgae biomass is present as an at least partially wet feedstock, and the method is conducted at atmospheric pressure.

\* \* \* \* \*

UNITED STATES PATENT AND TRADEMARK OFFICE
CERTIFICATE OF CORRECTION

PATENT NO.       : 8,927,240 B1
APPLICATION NO.  : 13/294510
DATED            : January 6, 2015
INVENTOR(S)      : Maddi et al.

Page 1 of 1

It is certified that error appears in the above-identified patent and that said Letters Patent is hereby corrected as shown below:

In the Claims

Column 13, line 48, Claim 2 after least one delete "inert".

Column 14, line 63, Claim 13 delete "(q)" and replace with -- (g) --.

Column 14, line 66, Claim 14 delete "(q) the esterification" and replace with -- (g) --.

Signed and Sealed this
Nineteenth Day of May, 2015

Michelle K. Lee
*Director of the United States Patent and Trademark Office*